United States Patent
Charbonnier et al.

(10) Patent No.: US 10,518,897 B2
(45) Date of Patent: Dec. 31, 2019

(54) METHOD AND DEVICE FOR DISPLAYING A SYMBOLOGY FOR ASSISTING THE PILOTING OF AN AIRCRAFT DURING A LANDING PHASE

(71) Applicant: AIRBUS OPERATIONS (S.A.S.), Toulouse (FR)

(72) Inventors: Christine Charbonnier, Saint Lys (FR); Rodolphe Bonet, Toulouse (FR); Laetitia Thenault, Nailloux (FR)

(73) Assignee: Airbus Operations (S.A.S.), Toulouse (FR)

( * ) Notice: Subject to any disclaimer, the term of this patent is extended or adjusted under 35 U.S.C. 154(b) by 69 days.

(21) Appl. No.: 15/462,499

(22) Filed: Mar. 17, 2017

(65) Prior Publication Data

US 2017/0275020 A1 Sep. 28, 2017

(30) Foreign Application Priority Data

Mar. 24, 2016 (FR) .................... 16 52559

(51) Int. Cl.
*B64D 45/08* (2006.01)
*G06F 3/147* (2006.01)
(Continued)

(52) U.S. Cl.
CPC ............ *B64D 45/08* (2013.01); *B64D 43/00* (2013.01); *B64D 45/04* (2013.01); *G01C 23/00* (2013.01);
(Continued)

(58) Field of Classification Search
CPC .............................. B64D 45/08; B64D 43/00
See application file for complete search history.

(56) References Cited

U.S. PATENT DOCUMENTS 5,353,022 A * 10/1994 Middleton ........... G05D 1/0083
340/959
7,853,370 B2 12/2010 Coulmeau et al.
(Continued)

FOREIGN PATENT DOCUMENTS

EP 1847899 A1 10/2007
FR 2906066 A1 3/2008

OTHER PUBLICATIONS

French Search Report for Application No. 1652559 dated Dec. 8, 2016.

*Primary Examiner* — Jess Whittington
(74) *Attorney, Agent, or Firm* — Jenkins, Wilson, Taylor & Hunt, P.A.

(57) ABSTRACT

A method and device for displaying a symbology for assisting the piloting of an aircraft during a landing phase. The display device allows a crew to anticipate or avoid emission of a runway overrun warning, able to be emitted by a piloting assistance unit. The display device includes a display unit to display a symbology, a module for determining characteristics of the runway and an end of runway margin, a module for determining a run distance necessary for the aircraft to attain a run speed, when the piloting assistance unit operates in a first mode, a transmission module configured for transmitting a set of signals making it possible for the display unit to display a symbol representative of the run distance, at least one symbols representative of the characteristics of the runway and a symbol representative of the end of runway margin.

12 Claims, 4 Drawing Sheets

(51) Int. Cl.
*G06T 11/60* (2006.01)
*B64D 45/04* (2006.01)
*G01C 23/00* (2006.01)
*G08G 5/00* (2006.01)
*G08G 5/02* (2006.01)
*B64D 43/00* (2006.01)

(52) U.S. Cl.
CPC .............. *G06F 3/147* (2013.01); *G06T 11/60* (2013.01); *G08G 5/0021* (2013.01); *G08G 5/025* (2013.01)

(56) References Cited

U.S. PATENT DOCUMENTS

| | | | |
|---|---|---|---|
| 8,275,501 B2 * | 9/2012 | Villaume | B64D 45/04 |
| | | | 701/18 |
| 9,132,913 B1 * | 9/2015 | Shapiro | B64C 19/00 |
| 9,245,450 B1 | 1/2016 | Chiew et al. | |
| 2004/0167685 A1 | 8/2004 | Ryan et al. | |
| 2008/0162092 A1 * | 7/2008 | Coulmeau | G05D 1/0676 |
| | | | 703/2 |
| 2010/0036552 A1 * | 2/2010 | Pepitone | G05D 1/0676 |
| | | | 701/18 |
| 2010/0161158 A1 * | 6/2010 | Gannon | G01C 23/00 |
| | | | 701/4 |
| 2010/0191394 A1 * | 7/2010 | Villaume | G05D 1/0083 |
| | | | 701/16 |
| 2013/0325245 A1 * | 12/2013 | Kolcarek | G06F 17/00 |
| | | | 701/29.1 |
| 2015/0120098 A1 * | 4/2015 | Catalfamo | G08G 5/02 |
| | | | 701/16 |
| 2017/0129623 A1 * | 5/2017 | Brardo | G08G 5/0021 |

* cited by examiner

FIG. 1

| | LEGEND |
|---|---|
| E1 | DETERMINING THE CHARACTERISTICS OF THE RUNWAY |
| E2 | DETERMINING A RUN DISTANCE |
| E3 | TRANSMITTING TO THE DISPLAY UNIT |
| E3.1 | TRANSMISSION OF A RUNWAY SYMBOLOGY |
| E3.2 | TRANSMISSION OF A DISTANCES SYMBOLOGY |
| E4 | REPETITIVELY DETERMINING A STOPPING DISTANCE |
| E5 | TRANSMITTING TO THE DISPLAY UNIT |
| E5.1 | TRANSMISSION OF A RUNWAY SYMBOLOGY |
| E5.2 | TRANSMISSION OF A DISTANCES SYMBOLOGY |
| E6 | RECONFIGURATION STEP |
| E6.1 | RECONFIGURATION FROM SECOND MODE TO FIRST MODE |
| E6.2 | RECONFIGURATION FROM FIRST MODE TO SECOND MODE |

Fig. 8

METHOD AND DEVICE FOR DISPLAYING A SYMBOLOGY FOR ASSISTING THE PILOTING OF AN AIRCRAFT DURING A LANDING PHASE

CROSS-REFERENCE TO RELATED APPLICATION

This patent application claims the benefit of and priority to French patent application number FR 16 52559, filed on Mar. 24, 2016, the entire disclosure of which is incorporated by reference herein.

TECHNICAL FIELD

The present disclosure relates to a method and a device for displaying a symbology for assisting the piloting of an aircraft during a phase of landing on a runway.

BACKGROUND

At present there are methods and devices for assisting the piloting of an aircraft during a phase of landing on a runway. U.S. Pat. No. 8,275,501 B1 describes such a method or such a device. Such a method or device is a unit called a runway overrun prevention system (or unit) or ROPS (standing for "Runway Overrun Prevention System" in English.

In general, these devices are intended for estimating the stopping point of the aircraft on the runway based on the capability of the aircraft to stop in nominal conditions. The adjective "nominal" qualifies the fact that there are no cases of failure that could degrade the deceleration capability of the aircraft.

If, at any point during the landing phase, the method or the device predicts that the aircraft will not be capable of stopping on the runway, at least one warning is triggered. Such a warning allows the crew to carry out a go-around maneuver if it is still possible to do this. If is it no longer possible to carry out a go-around and if the aircraft is on the ground, these warnings can also incite the crew to use any available means of deceleration, such as a maximum braking and a maximum thrust reversal, in order to stop the aircraft on the remaining length of the runway.

Thus, a unit of the ROPS type will emit a warning in the case of detection of a risk of runway overrun, in order to incite the crew to use any means of deceleration or to automatically initiate a means of deceleration. For example, a maximum braking can be triggered by the crew or triggered automatically and a maximum thrust reversal can be triggered by the crew. Such a warning represents a final safety net so that the pilot can initiate an emergency action.

When the aircraft is in flight or on the ground, the ROPS unit computes in real time a stopping distance which corresponds to a distance an aircraft travels in order to stop on a runway. This stopping distance is continually compared with the length of the runway remaining in front of the aircraft. Thus, if the computed stopping distance is greater than the length of the runway, dedicated warnings are emitted. These warnings can correspond to messages displayed on the main flight screen (PFD, standing for "Primary Flight Display" in English) and an audible warning from loud speakers. These dedicated warnings thus separate the world into a white region in which no warning is emitted and a black region in which the dedicated warnings are emitted.

The ROPS unit comprises two sub-functions: a Runway Overrun Warning function (ROW standing for "Runway Overrun Warning" in English) and a Runway Overrun Prevention function (ROP standing for "Runway Overrun Prevention" in English). The ROW function allows the generation of warnings inciting the crew to go around whilst the ROP function allows the generation of warnings inciting the crew to activate deceleration devices. The ROW function is active starting from a predetermined height, for example 500 feet (152 m), and remains active until a decision point. After this decision point, the ROP function is active. The ROP function remains active until the aircraft AC attains a run speed.

The decision point can correspond to the detection of a solid ground condition, that is to say a condition corresponding to the fact that the automatic brakes ("autobrakes" in English") are activated and that the ground spoilers ("ground spoilers" being the English term) are deployed. This decision point can therefore be represented by the following logic:

the decision point is confirmed if at least one of the following conditions is met:
   the main landing gears (MLG standing for "Main Landing Gears" in English) and the nose landing gear or gears (NLG standing for "Nose Landing Gears" in English) have been compressed for 1 s;
   the full deployment of the ground spoilers has been requested.
One of these two conditions can be met if the automatic braking is activated.

For certain aircraft, there are no available means for the crew to be able to anticipate a warning generated by the ROPS unit since no other indication apart from that of the warning is provided to the crew.

For other aircraft, indications are provided to the crew by the intermediary of an airport navigation screen ("airport navigation display" in English) but at least one action by the crew is necessary in order to access these indications. Moreover, the display of these indications can mask the navigation and monitoring information which must be monitored during the landing phase.

Consequently, the continuous display of these indications is not possible during the landing phase.

SUMMARY

A purpose of the present disclosure is to overcome this disadvantage by proposing a method and a device allowing the crew of an aircraft to anticipate or to prevent the emission of a runway overrun warning.

For this purpose, the disclosure herein relates to a method for displaying a symbology for assisting the piloting of an aircraft during a phase of landing on a runway. The symbology is displayed on a display unit in association with a unit for assisting piloting during a landing phase capable of operating in at least a first operating mode when the aircraft is on the ground. The piloting assistance unit is able or configured to emit a signal representative of its operating mode.

According to the disclosure herein, the method comprises:
   a step of determining characteristics of the runway, implemented by a first determination module, comprising the determination of characteristics of the runway;
   a first series of sub-steps when the piloting assistance unit transmits a signal representative of the first operating mode to a second determination module, the first series of steps comprising:
      a first distance determining sub-step, implemented repetitively by the second determination module, comprising the determination of a run distance corresponding to a distance necessary for the aircraft to attain a run speed;

a sub-step of transmission to the display unit of a symbology of the first operating mode, implemented by a first transmission module, comprising the transmission to the display unit of a set of signals making it possible for the display unit to display a symbol of a run distance and to display at least one symbol representative of characteristics of the runway.

Thus, thanks to the disclosure herein, the method makes it possible for a display always to be available for the crew without any action on its part order that it can implement the actions necessary for anticipating or preventing a runway overrun warning emitted by a ROPS unit.

In a preferred embodiment, the method comprises moreover a second series of sub-steps when the piloting assistance unit transmits to a third determination module a signal representative of a second operating mode when the aircraft is in flight, the second series of sub-steps comprising:

a second distance determining sub-step, implemented repetitively by the third determination module, consisting of or comprising determining:
  either a stopping distance on a dry runway and a stopping distance on a wet runway;
  or a stopping distance on a runway in a selected state, if the third determination module receives a signal representative of the selected runway state, the signal being able or configured to be transmitted to the third determination module by a runway state selection module;

a sub-step of transmission to the display unit of a symbology of the second operating mode, implemented by a second transmission module, consisting of or comprising transmitting to the display unit a set of signals making it possible for the display unit to display at least one symbol representative of the characteristics of the runway and to display:
  either a symbol representative of the stopping distance on a dry runway and a symbol representative of the stopping distance on a wet runway;
  or a symbol representative of the stopping distance on a runway in the selected state.

Advantageously, the step of determination of the characteristics of the runway consists of or comprises determining a length of the runway and coordinates of a point of vacating the runway on a reference line marking the runway, on the basis of signals coming from an airport database.

Moreover, the first distance determining sub-step consists of or comprises determining coordinates of a run point after which the aircraft attains a run speed on the reference line marking the runway, on the basis of signals coming from the piloting assistance unit.

Moreover, the sub-step of transmission of a symbology of the first mode comprises:

a first sub-step of transmission of a runway symbology, implemented by the first transmission module, consisting of or comprising transmitting a set of signals making it possible for the display unit to display a symbol representative of the runway on the basis of the length of the runway and a symbol locating the runway vacate point on the basis of the coordinates of the runway vacate point on the reference line marking the runway;

a first sub-step of transmission of a distances symbology, implemented repetitively by the first transmission module, consisting of or comprising transmitting a set of signals making it possible for the display unit to display a symbol locating the run point on the basis of the coordinates of the run point, the display of this symbol being able or configured to be refreshed by the display unit at each transmission of the set of signals.

Moreover, the step of determination of characteristics of the runway also consists of or comprises determining the coordinates of an end of runway margin on the reference line marking the runway corresponding to a predetermined margin before the downstream end of the runway in the direction of landing of the aircraft.

Moreover, the first sub-step of transmission of a runway symbology also consists of or comprises transmitting, by the first transmission module, a set of signals making it possible for the display unit to display a symbol representative of the predetermined margin on the basis of the coordinates of the end of runway margin.

Advantageously, the second sub-step of determination of distances consists moreover of or comprises determining, on the basis of signals coming from the piloting assistance unit:
  either coordinates of a stopping point of the aircraft on a dry runway according to the reference line marking the runway and coordinates of a stopping distance of the aircraft on a wet runway on the reference line marking the runway;
  or coordinates of a stopping point of the aircraft on a runway in the selected state on the reference line marking the runway.

According to one feature, the sub-step of transmission of a symbology of the second mode comprises:

a second sub-step of transmission of a runway symbology, implemented by the second transmission module, consisting of or comprising transmitting a set of signals making it possible for the display unit to display a symbol representative of the runway on the basis of the length of the runway and a symbol locating the runway vacate point on the basis of the coordinates of the runway vacate point on the reference line marking the runway;

a second sub-step of transmission of a distances symbology, implemented repetitively by the second transmission module, consisting of or comprising transmitting a set of signals making it possible for the display unit to display:
  either a symbol representative of the stopping distance of the aircraft on a dry runway on the basis of the coordinates of the stopping point on a dry runway and a symbol of the stopping distance on a wet runway on the basis of the coordinates of the stopping point on a wet runway on the reference line marking the runway;
  or a symbol representative of the stopping distance of the aircraft on the runway in the selected state on the basis of the coordinates of the stopping point on the runway in the selected state;

the display of these symbols being able or configured to be refreshed by the display unit at each transmission of the sets of these signals.

Preferably, the method comprises moreover a reconfiguration step, implemented by a reconfiguration module, consisting of or comprising carrying out at least one of the following sub-steps:

a sub-step consisting of or comprising transmitting a control signal to the display unit commanding the deletion of the symbols displayed after the sub-step of transmission of a symbology of the first mode, when the piloting assistance unit changes from a first operating mode to a second operating mode;

a sub-step consisting of or comprising transmitting a control signal to the display unit commanding the deletion of the symbols displayed after the step of transmission of a symbology of the second mode, when the piloting assistance unit changes from a second operating mode to a first operating mode.

The disclosure herein also relates to a device for displaying a symbology for assisting the piloting of an aircraft in a phase of landing on a runway in association with a unit for assisting piloting in a landing phase. The piloting assistance unit operates in at least a first mode when the aircraft is on the ground. The piloting assistance unit is capable of and configured for emitting a signal representative of the operating mode.

According to the disclosure herein, the device comprises:

a display unit capable of displaying the symbology;

a first module for determining the characteristics of the runway configured for determining the characteristics of the runway;

a second determination module configured for repetitively determining a run distance corresponding to a distance necessary for the aircraft to attain a run speed, when the piloting assistance unit transmits to the first determination module a signal representative of the first operation mode;

a first transmission module configured for repetitively transmitting a set of signals making it possible for the display unit to display a symbol representative of the run distance and to display at least one symbol representative of the characteristics of the runway.

According to a preferred embodiment, the device furthermore comprises:

a third determination module configured for repetitively determining, when the piloting assistance unit transmits to the third determination module a signal representative of the second operating mode:

either a stopping distance on a dry runway and a stopping distance on a wet runway;

or a stopping distance on a runway in a selected state, if the third determination module receives a signal representative of the selected runway state, the signal being able or configured to be transmitted to the third determination module by a runway state selection module;

a second transmission module configured for repetitively transmitting a set of signals making it possible for the display unit to display at least one symbol representative of the characteristics of the runway and to display:

either a symbol representative of the stopping distance on a dry runway and a symbol representative of a stopping distance on a wet runway;

or a symbol representative of the stopping distance on a runway in the selected state.

Moreover, the second determination module is also configured for determining the coordinates of an end of runway margin corresponding to a predetermined margin before the downstream end of the runway in the direction of landing of the aircraft, the first transmission module also being configured for transmitting a set of signals making it possible for the display unit to display a symbol representative of the margin predetermined from the coordinates of the end of runway margin.

Preferably, the device comprises moreover a reconfiguration module configured for carrying out at least one of sub-steps consisting of or comprising:

transmitting a control signal to the display unit commanding the deletion of the symbols displayed on the display unit, when the piloting assistance unit changes from a first operating mode to a second operation mode;

transmitting a control signal to the display unit commanding the deletion of the symbols displayed on the display unit when the piloting assistance unit changes from a second operating mode to a first operating mode.

The disclosure herein also relates to a system for assisting the piloting of an aircraft in a phase of landing on a runway. The system comprises a display device according to the disclosure herein and a unit for assisting piloting in a landing phase. The display unit of the system corresponds to a navigation screen.

The disclosure herein also relates to an aircraft, in particular a transport aircraft, which is provided with a device for displaying a piloting assistance symbology such as the one described above.

BRIEF DESCRIPTION OF THE DRAWINGS

The disclosure herein, with its features and advantages, will emerge more clearly on reading the description given with reference to the appended drawings in which.

DETAILED DESCRIPTION

The continuation of the description will refer to the figures mentioned above.

The disclosure herein relates to a method and a device 12 for displaying a symbology for assisting the piloting of an aircraft AC during a phase of landing on a runway T. The symbology is displayed on a display unit 1 in association with a unit for assisting piloting in a landing phase 10, such as a ROPS unit.

The unit for assisting piloting 10 in a landing phase can operate in a first operating mode.

The first operating mode is activated when the aircraft AC is on the ground. It corresponds, for example, to the ROP function for the ROPS unit.

Moreover, the piloting assistance unit 10 can operate in a second operating mode when the aircraft AC is in flight. It corresponds, for example to the ROW function for the ROPS unit.

The moment which separates the two operating modes is, for example, the moment of the decision point. The aircraft AC is essentially in flight before the decision point. It is essentially on the ground after the decision point.

The piloting assistance unit 10 is able or configured to send a signal s10 representative of its operating mode.

The crew can control the activation or deactivation of the piloting assistance unit 10. By way of example, this control can be carried out by a button in the cockpit of the aircraft AC.

In a particular embodiment of the piloting assistance unit 10, if the piloting assistance unit 10 is deactivated, the unit 10 operates only in the first operating mode when the aircraft AC is on the ground. In this case, the piloting assistance unit 10 does not operate in the second operating mode even if the aircraft AC is in flight.

In this latter embodiment, if the piloting assistance unit 10 is activated, the unit 10 operates in the second operating mode when the aircraft AC is essentially in flight and in the first operating mode when the aircraft AC is essentially on the ground.

For example, below a certain altitude, for example below 500 feet (approximately 152 m), if the crew has activated the piloting assistance unit 10, the piloting assistance unit 10 is activated in the first operating mode. During the final approach to the runway T, for as long as the runway T is detected and until the decision point is reached, the second mode remains activated.

Figure 1:
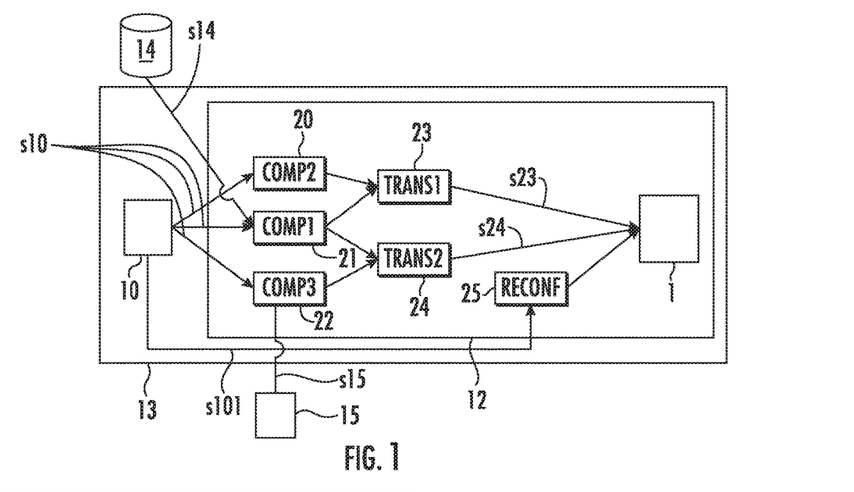
FIG. 1 shows a block diagram of a particular embodiment of a device for assisting the piloting of an aircraft in a phase of landing on a runway.

According to the disclosure herein, the display device 12 which is installed in the aircraft AC comprises, as shown in FIG. 1:
- a display unit 1;
- a first module 21 COMP1 (COMP standing for "computation module" in English) for determining characteristics of the runway T configured for determining the characteristics of the runway T;
- a second determination module 20 COMP2 configured for repetitively determining a run distance corresponding to a distance necessary for the aircraft AC to attain a run speed, when the piloting assistance unit 10 transmits to the second determination module 20 a signal s10 representative of the first operating mode; and
- a first transmission module 23 TRANS1 (TRANS standing for "transmission module" in English) configured for repetitively transmitting a set of signals s23 making it possible for the display unit 1 to display a symbol 7 representative of the run distance and to display at least one symbol 3 and 6 representative of the characteristics of the runway T.

In a non-limiting way, the run speed corresponds to a speed of 10 knots (approximately 18.5 km/h).

Figure 3:
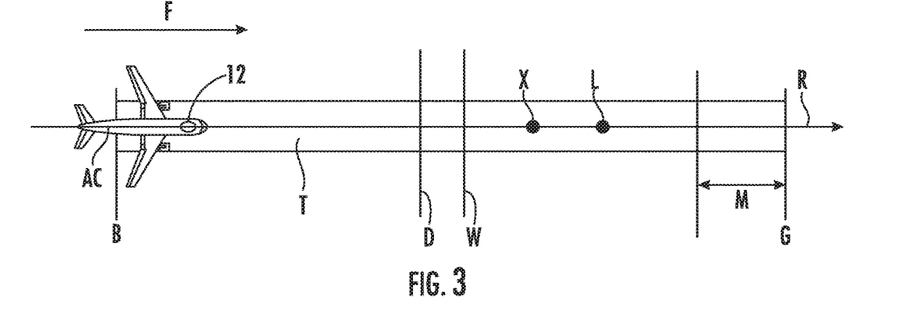
FIG. 3 shows a perspective view of an aircraft comprising the device.

Advantageously, the characteristics of the runway T determined by the first determination module 21 correspond to a length of the runway T and coordinates of a runway T vacate point L on a reference line R marking the runway T (FIG. 3).

By way of example, the length of the runway T can correspond to the coordinates of an upstream end B of the runway T and to the coordinates of a downstream end G of the runway T in the direction of landing F of the aircraft AC. Moreover, the coordinates of the upstream end B of the runway T can be considered as the origin of the reference line R marking the runway T. This determination can be made on the basis of signals s14 coming from a database 14 of an airport control station such as a runways database hosted in an impact awareness and warning system (TAWS standing for "Terrain Awareness and Warning System" in English).

By way of example, the vacate point L of the runway T can define a distance between the upstream end B of the runway T and the vacate point L. This distance corresponds to a preselected distance to be sent to a braking unit allowing a vacation of the runway T of the BTV (standing for "Brake To Vacate" in English) type. The BTV braking unit indicates or controls the combination of brakes and thrust reversals necessary for the aircraft AC to be stopped, for example, at a vacate point at the level of a runway exit.

According to one embodiment, the first determination module 21 is also configured for determining the coordinates of an end of runway T margin M corresponding to a predetermined distance margin M before the downstream end G of the runway T in the direction of landing F of the aircraft AC on the runway T. According to this embodiment, the first transmission module 23 is also configured for transmitting a set of signals making it possible for the display unit 1 to display a symbol representative of the margin M predetermined on the basis of the coordinates of the end of runway T margin M.

In a non-limiting way, the predetermined distance margin M has a length of 300 m.

According to a preferred embodiment, the device 12 comprises moreover:
- a third determination module 22 COMP3 configured for repetitively determining at least one stopping distance, when the piloting assistance unit 10 transmits to the third determination module 22 a signal s10 representative of the second operating mode; and
- a second transmission module 24 TRANS2 configured for repetitively transmitting a set of signals s24 making it possible for the display unit 1 to display a symbol representative of at least one stopping distance and to display at least one symbol representative of the characteristics of the runway T.

According to a variant, the crew has the possibility of selecting a runway state by a runway state selection module 15. The runway state selection module 15 is configured for sending a signal s15 representative of the runway state selected by the crew. By way of example, the runway state selection module 15 is a button having at least a position corresponding to a wet runway and a position and a position corresponding to a dry runway.

If the third determination module 15 does not receive a signal s15 representative of the selected runway state transmitted by the runway state selection module 15, the third determination module 22 is able or configured to repetitively determine a stopping distance on a dry runway and a stopping distance on a wet runway. The second transmission module 24 is then able or configured to repetitively transmit a set of signals s24 making it possible for the display unit 1 to display a symbol representative of a stopping distance on a dry runway and a stopping distance on a wet runway.

If the third determination module 15 receives a signal s15 representative of the selected runway state transmitted by the runway state selection module 15, the third determination module 22 is configured for repetitively determining a stopping distance on a runway in the state selected by the runway state selection module 15. The second transmission module 24 is able or configured to repetitively transmit a set of signals s24 making it possible for the display unit 1 to display a symbol representative of a stopping distance on a runway in the selected state.

According to a preferred embodiment, the display device 12 comprises moreover a reconfiguration module 25 RECONF (standing for "reconfiguration unit" in English) configured for carrying out at least one of the sub-steps consisting of or comprising:
- transmitting a control signal s25 to the display unit 1 commanding the deletion of the symbols displayed on the display unit 1, when the piloting assistance unit 10 changes from a second operating mode to a first operating mode; and transmitting a control signal s25 to the display unit 1 commanding the deletion of the symbols displayed on the display unit 1, when the piloting assistance unit 10 changes from a first operating mode to a second operating mode.

According to one embodiment, the COMP1, COMP2, COMP3, TRANS1, TRANS2, RECONF modules are integrated in a central processing unit 13 or a computer.

By way of example, the modules can correspond to algorithms implemented in a software manner in the central processing unit 13.

In particular, the modules can be stored in a memory area of the central processing unit 13.

The display device 12 can form part of a system 10 for assisting the piloting of an aircraft AC during a phase of landing on a runway T. This system 10 comprises a display device 12 and a unit 10 for assisting piloting during a landing phase.

Figure 2:
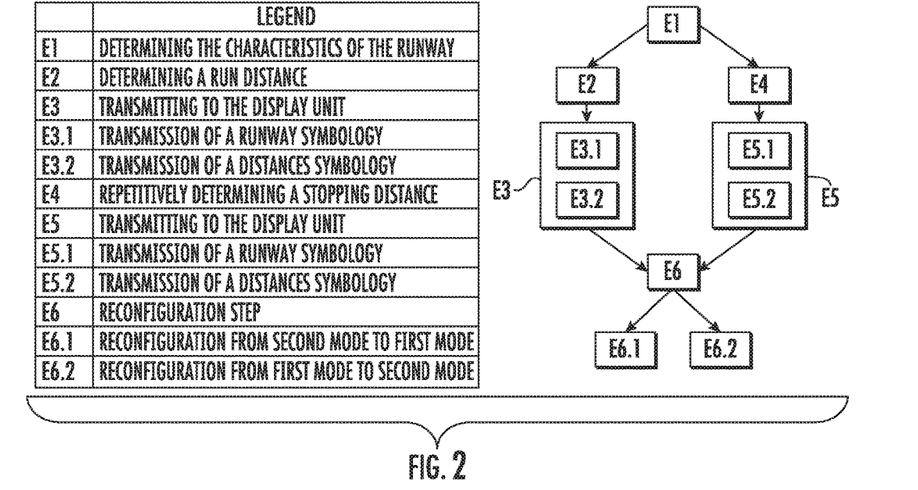
FIG. 2 shows a block diagram of steps implemented by the device.

The device, such as described above, implements the following set of steps of a method for displaying a symbology shown in FIG. 2. The method comprises at least a step E1 of determination of the characteristics of the runway T, implemented by the first determination module 21, consisting of or comprising determining the characteristics of the runway T.

According to one embodiment, the step E1 of determination of the characteristics of the runway T consists of or comprises determining a length of the runway T and the coordinates of a runway T vacate point L on a reference line R marking the runway T (FIG. 3).

When the piloting assistance unit 10 operates in the first operating mode, the unit 10 transmits to the second determination module 20 a signal s10 representative of the first operating mode.

The method then comprises a first series of sub-steps including:
 a first sub-step E2 for determining distance, repetitively implemented by the second determination module 20, consisting of or comprising determining a run distance corresponding to a distance necessary for the aircraft AC to attain a run speed;
 a sub-step E3 of transmission to the display unit 1 of a symbology OG of the first operating mode, implemented by the first transmission module 23. This transmission sub-step E3 consists of or comprises transmitting to the display unit 1 a set of signals s23 making it possible for the display unit 1 to display a symbol 7 representative of a run distance and to display at least one symbol 3 representative of the characteristics of the runway T.

According to one embodiment, the first E2 sub-step of determination of distance consists of or comprises determining the coordinates of a run point X after which the aircraft AC attains a run speed on the reference line R marking the runway T, on the basis of signals coming from the piloting assistance unit 10 (FIG. 3).

According to one embodiment, the sub-step E3 of transmission of a symbology OG of the first mode comprises a first sub-step E3.1 of transmission of a runway T symbology, implemented by the first transmission module 23 and a second sub-step E3.2 of transmission of a distances symbology, repetitively implemented by the first transmission module 23.

The first sub-step E3.1 of transmission of a runway T symbology consists of or comprises transmitting a set of signals making it possible for the display unit 1 to display a symbol 3 representative of the runway T on the basis of the length of the runway T and a symbol 6 locating the runway T vacate point L on the basis of the coordinates of the runway T release point on the reference line marking the runway T.

The second sub-step E3.2 of transmission of a distances symbology consists of or comprises repetitively transmitting a set of signals making it possible for the display unit 1 to display a symbol 7 locating the run point X on the basis of the coordinates of the run point.

The display of the symbol 7 locating the run point X is able or configured to be refreshed by the display unit 1 at each transmission of the set of signals s23 by the first transmission module 23.

According to one embodiment, the determination step E1 consists moreover of or comprises determining, by the first determination module 21, the coordinates of an end of runway T margin M on the reference line R marking the runway T (FIG. 3). The coordinates of the end of runway T margin M correspond to a predetermined distance margin N before the downstream end G of the runway T in the direction of landing F of the aircraft AC. In this embodiment, the first transmission sub-step E3.1 consists moreover of or comprises transmitting, by the first transmission module 23 a set of signals making it possible for the display unit 1 to display a symbol 8 representative of the predetermined margin M before the downstream end G of the runway T on the basis of the coordinates of the end of runway T margin M.

Thus, during the first operating mode of the piloting assistance unit 10, a synthetic runway corresponding to the first operating mode is displayed on the display unit 1 of the navigation screen ("navigation display"» in English) with the characteristics of the runway T such as its length, the location of the runway T vacate point L and the run distance X on the same reference line R marking the runway T.

When the piloting assistance unit 10 operates in the first operating mode, the aircraft AC essentially being on the ground, the crew has the intention of stopping the aircraft AC. The navigation and monitoring information 2 are therefore no longer habitually of any use. Thus, the display of the symbols of the symbology OG of the first mode can be centered on the display unit 1.

In a preferred embodiment, the runway T is symbolized by a rectangle 3. The rectangle 3 can furthermore comprise a measuring scale 9, for example every 300 m on the reference line marking the runway T. The location of the run point X is symbolized by a bar 7 perpendicular to the symbol 3 of the runway T and disposed according to its coordinates on the reference line R marking the T. The location of the runway T vacate point L is symbolized by a spot or a disk 6 placed on the symbol 3 of the runway T according to its coordinates on the reference line R marking the runway T. The predetermined margin M is symbolized by a dotted line 8 parallel with the symbol 3 of the runway T.

The display of the symbol 7 of the location of the run point X is repetitively updated so that it corresponds to a run distance determined according to the real parameters of the aircraft AC, such as the deceleration of the aircraft AC.

This allows the crew to be up to date in real time with regard to the stopping margin or of its capability of vacating the runway T at the appropriate preselected point.

In one embodiment, different colors can be used for differentiating between the symbols or for warning the crew.

Figure 7:
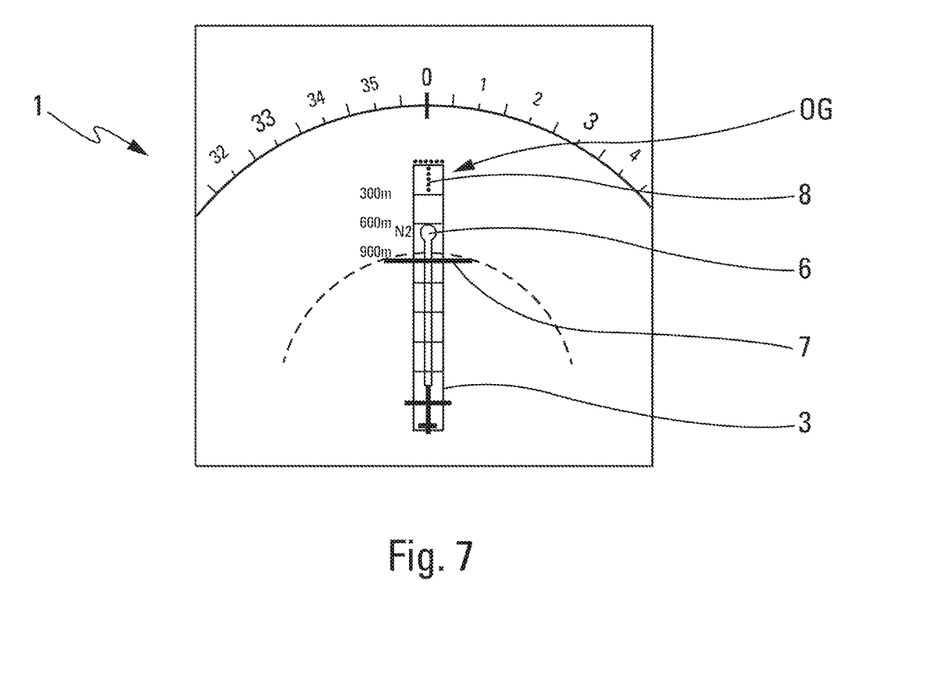
FIG. 7 shows a first example of display on a display unit according to a symbology of a first operating mode.

For example, in the case where the run distance is shorter than the vacate distance and the length of the runway T as shown in FIG. 7, the runway T is symbolized by a gray rectangle 3, the location of the run point X by a green bar 7, the location of the vacate point L by a blue spot or a blue disk 6 and the predetermined margin M by a dotted red line 8.

Figure 8:
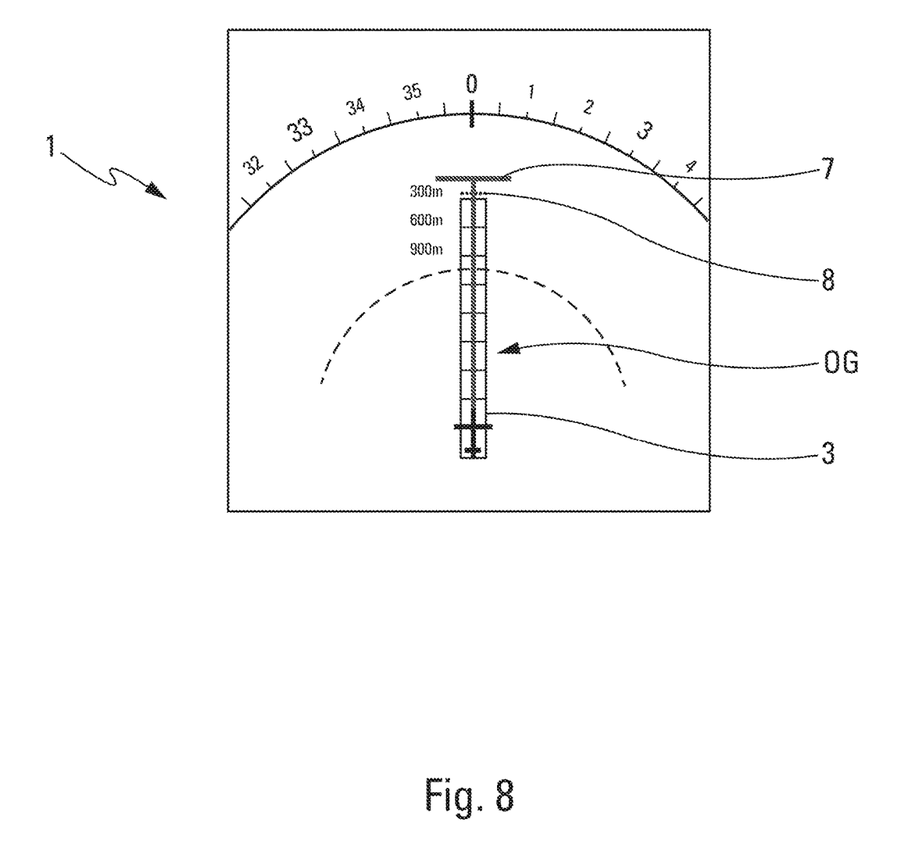
FIG. 8 shows a second example of display on a display unit according to a symbology of a first operating mode.

In the case where the run distance is longer than the length of the runway T as shown in FIG. 8, the location of the run point X is symbolized by a red bar 7.

The symbology OG of the first mode can be superimposed on the symbology 2 corresponding to the information necessary for piloting during the landing phase of the aircraft.

When the piloting assistance unit 10 operates in the second operating mode, the unit 10 transmits to the third determination module a signal s10 representative of the second operating mode.

The method then comprises a second series of sub-steps including:
- a second distances determination sub-step E4, repetitively implemented by the third determination module 22, consisting of or comprising determining at least a stopping distance on a runway; and
- a sub-step E5 of transmission to the display unit 1 of a symbology IA of the second operating mode, implemented by the second transmission module 24. This transmission sub-step E5 consists of or comprises transmitting to the display unit 1 a set of signals s24 making it possible for the display unit 1 to display a symbol 4 representative of at least a stopping distance and to display at least one symbol representative of the characteristics of the runway T.

According to one embodiment, the second distances determination sub-step E4 consists of or comprises determining the coordinates of at least one stopping point of the aircraft AC on the reference line R marking the runway T. If the third determination module 22 does not receive a signal s15 representative of the selected runway state transmitted by the runway state selection module 15, the third determination module 22 determines the coordinates of a stopping point D of the aircraft AC on a dry runway on the reference line R marking the runway T and the coordinates of a stopping point W of the aircraft AC on a wet runway on the reference line R marking the runway. If the third determination module 22 receives a signal s15 representative of the selected runway state transmitted by the runway state selection module 15, the third determination module 22 determines the coordinates of a stopping point of the aircraft AC on a runway in the selected state on the reference line R marking the runway T.

According to one embodiment, the sub-step E5 of transmission of a symbology IA of the second mode comprises a first sub-step E5.1 of transmission of a runway T symbology, implemented by the second transmission module 24 and a second sub-step E5.2 of transmission of a distances symbology, repetitively implemented by the second transmission module 24.

The first sub-step E5.1 of transmission of a runway T symbology consists of or comprises transmitting a set of signals making it possible for the display unit 1 to display a symbol 3 representative of the runway T on the basis of the length of the runway T and a symbol 6 locating the runway T vacate point L on the basis of the coordinates of the runway T vacate point L on the reference line R marking the runway T.

The second sub-step E5.2 of transmission of a distances symbology consists of or comprises repetitively transmitting a set of signals making it possible for the display unit 1 to display a symbol 4 representative of the stopping distance or distances of the aircraft AC.

If the third determination module 22 has not received a signal s15 representative of the selected runway state transmitted by the runway state selection module 15, the second transmission module 24 repetitively transmits a set of signals making it possible for the display unit 1 to display a symbol representative of the stopping distance on a dry runway on the basis of the coordinates of the stopping point D on a dry runway and a symbol 5 of the stopping distance W on a wet runway on the reference line R marking the runway T. If the third determination module 22 has received a signal s15 representative of the runway state, the second transmission module 24 repetitively transmits a signal making it possible for the display unit 1 to display a symbol representative of the stopping distance on a runway in the selected state on the basis of the coordinates of the stopping point of the aircraft AC on a runway in the selected state on the reference line R marking the runway T.

The display of the symbols 4 and 5 representative of the stopping distances is able or configured to be refreshed by the display unit 1 at each transmission of these sets of signals s24 by the second transmission module 24.

Thus, during the second operating mode of the display unit, a synthetic runway corresponding to the second operating mode is displayed on the display unit 1 identical to the display unit displaying a symbology OG of the first operating mode with the characteristics of the runway T, such as its length, the location of the runway T vacate point L and the stopping distances on a same reference line R marking the runway T.

The symbology IA of the second operating mode is superimposed on the symbology 2 corresponding to the information necessary for the piloting during this landing phase such as the navigation and monitoring information.

Preferably, the display of the symbols of the symbology IA of the second operating mode is implemented in such a way that it does not mask the information necessary for the piloting such as the navigation and monitoring information. For example, the symbols of the second operating mode are displayed on the right side or on the left side of the display unit 1.

Figure 4:
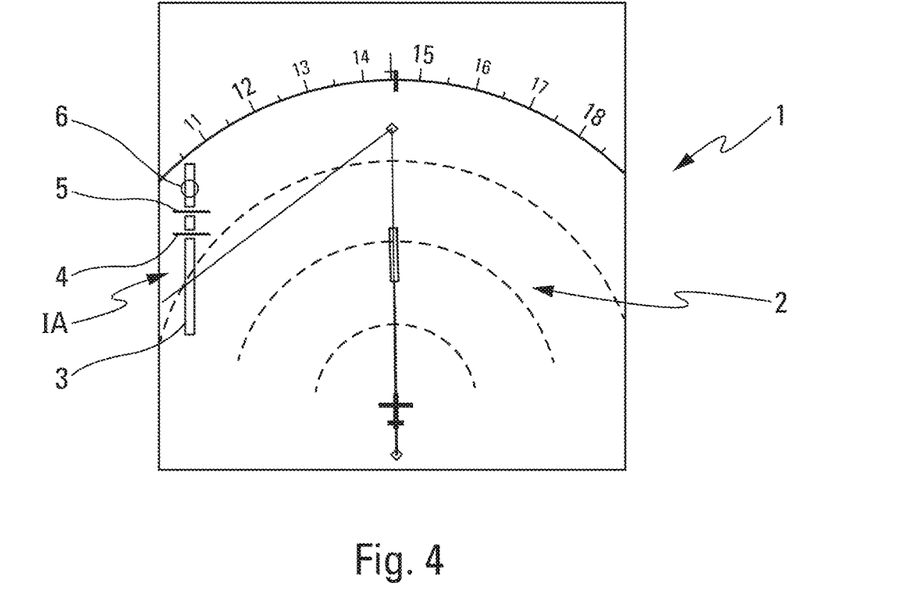
FIG. 4 shows a first example of display on a display unit according to a symbology of a second operating mode.
Figure 5:
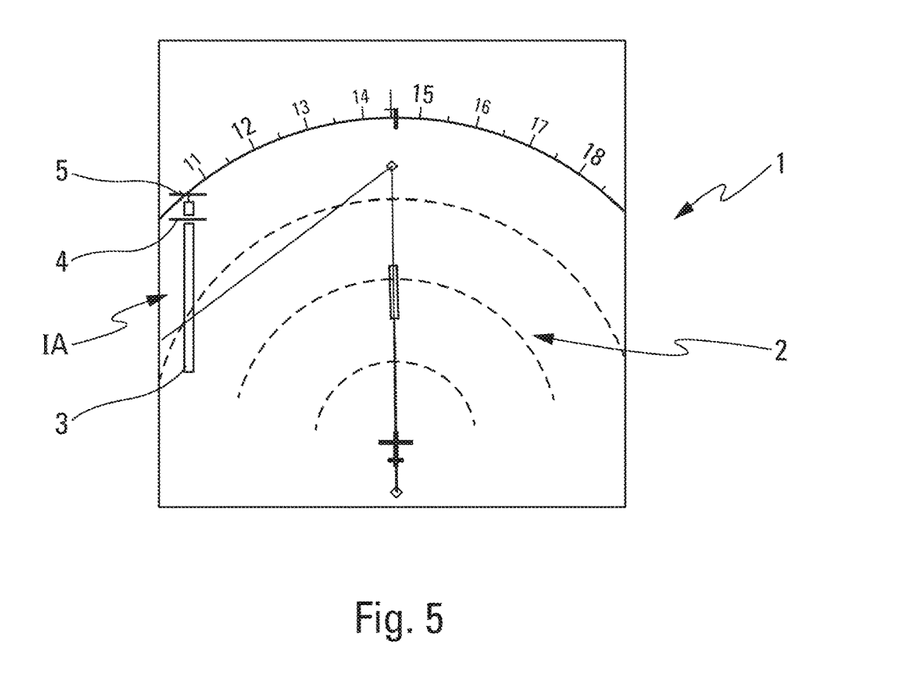
FIG. 5 shows a second example of display on a display unit according to a symbology of a second operating mode.
Figure 6:
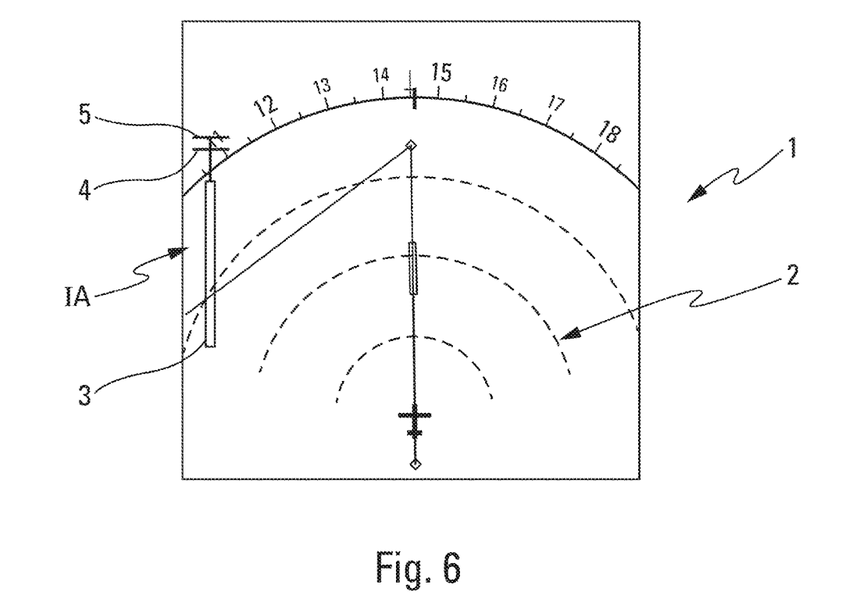
FIG. 6 shows a third example of display on a display unit according to a symbology of a second operating mode.

In a preferred embodiment such as shown in FIGS. 4 through 6, the runway T is symbolized by a rectangle 3. If the third determination module 22 has not received a signal s15 representative of the runway state, the stopping points D and W are symbolized by bars 4 and 5 perpendicular to the symbol 3 of the runway T and disposed according to their coordinates on the reference line R marking the runway T. The location of the runway T vacate point L is symbolized by a spot or a disk 6 placed on the symbol 3 of the runway T according to its coordinates on the reference line R marking the runway T. The display of the symbols 4 and 5 of the stopping points is repetitively updated so that they correspond to stopping distances determined according to the real parameters of the aircraft AC, such as the current configuration of the aircraft AC or the speed of the aircraft AC, and according to the real external conditions. The real external conditions can correspond to meteorological conditions such as wind conditions. This makes it possible for the crew to be aware of the stopping margin of the aircraft AC in real time up until the landing.

In one embodiment, different colors can be used. Different colors make it possible to differentiate between the symbols or to warn the crew with dedicated colors in the case of a warning.

For example in the case where the stopping distances are shorter than the length of the runway T as shown in FIG. 4, the runway T is symbolized by a gray rectangle 3, the stopping points D and W by magenta bars 4, 5 and the location of the vacate point L by a blue spot or a blue disc 6.

In the case where the stopping distance W on a wet runway is longer than the length of the runway T and when the stopping distance D on a dry runway is shorter than the length of the runway T as shown in FIG. 5, the runway T is symbolized by an orange rectangle 3, the stopping point D on a dry runway by a magenta bar 4 and the stopping point W on a wet runway by an orange bar 5.

In the case where the stopping distances D and W are longer than the length of the runway T as shown in FIG. 6, the runway T is symbolized by a red rectangle 3 and the stopping points 4 and 5 are symbolized by red bars.

The transition from the symbology OG of the first mode to the symbology IA of the second mode and vice-versa, corresponds to the decision point the concept of which is explained above.

Thus, according to a preferred embodiment the method comprises a reconfiguration step E6, implemented by the reconfiguration module 25, consisting of or comprising carrying out at least one of the following sub-steps:

a sub-step E6.1 consisting of or comprising transmitting a control signal s25 to the display unit 1 commanding the deletion of the symbols displayed after the sub-step E3 of transmission of a symbology IA of the second mode, when the piloting assistance unit 10 changes from the second operating mode to the first operating mode; and a sub-step E6.2 consisting of or comprising transmitting a control signal s25 to the display unit 1 commanding the deletion of the symbols displayed after the step of transmission of a symbology OG of the first mode, when the piloting assistance unit 10 changes from the first operating mode to the second operating mode.

The piloting assistance unit 10 transmits to the reconfiguration module 25 a signal s101 representative of its operating mode in order to inform the reconfiguration module 25 of the change of operating mode of the piloting assistance unit 10.

Thus, when the piloting assistance unit 10 changes from one mode to the other, the display of the symbology is reconfigured automatically without any action by the crew.

Below a predetermined altitude, for example 400 feet (approximately 122 m), the method is implemented automatically by the device 12 for displaying a piloting assistance symbology.

According to one embodiment, the scale used for the symbology OG of the first operating mode is defined so that a distance is always displayed in front of the aircraft AC. This distance is chosen for a stopping distance necessary in the worst performance conditions. In a non-limiting way, the distance corresponds to a distance of 3000 m. If the crew capable of visualizing the performance on the ground on such a distance in front of the aircraft AC, it will then be able to carry out the correct corrective actions.

If the crew decides to carry out a go-around after the decision point, that is to say when the symbology OG of the first operating mode is displayed, the symbology OG of the first operating mode is automatically deleted when the throttle controls are pushed into a Take Off/Go Around mode (TO/GA standing for "Take Off/Go Around" in English). The navigation screen returns to a display of navigation and monitoring information.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for displaying a symbology for assisting piloting of an aircraft during a phase of landing on a runway, the symbology being displayed on a display unit in association with a piloting assistance unit for assisting piloting during a landing phase, the piloting assistance unit being configured to operate in at least a first operating mode and a second operating mode, and further configured to emit a signal representative of its operating mode, the method comprising:

determining characteristics of the runway, implemented by a first determination module comprising one or more processors, comprising:
determining characteristics of the runway;
determining coordinates of an end of runway margin on a reference line marking the runway corresponding to a predetermined margin before a downstream end of the runway in a direction of landing of the aircraft; and
determining a distance between a beginning of the runway and a runway vacate point and coordinates of the runway vacate point on a reference line marking the runway, based at least partially on signals coming from an airport database; and when the piloting assistance unit transmits to a second determination module comprising one or more processors a signal representative of the first operating mode, the method further comprising:
determining a run distance corresponding to a distance necessary for the aircraft to attain a run speed; and
transmitting to the display unit using a first transmission module comprising a transmitter, a set of signals causing the display unit to display:
a symbol representative of the run distance;
at least one symbol representative of characteristics of the runway; and
a symbol representative of the margin predetermined on a basis of the coordinates of the end of runway margin;

wherein coordinates of the vacate point are transmitted to a braking unit of the aircraft configured to control brakes and thrust reversals of the aircraft based at least partially on the aircraft's proximity to the vacate point; and wherein the piloting assistance unit is configured to automatically operate in the first operating mode when the aircraft is below a predetermined altitude but has not landed yet.

2. The method as claimed in claim 1, further comprising:
when the piloting assistance unit transmits to a third determination module comprising one or more processors a signal representative of the second operating mode:

repetitively determining, by the third determination module, either of:
   either of a stopping distance on a dry runway and a stopping distance on a wet runway; or
   a stopping distance on a runway in a selected state, if the third determination module receives a signal representative of the selected runway state, the signal being configured to be transmitted to the third determination module by a runway state selection module comprising one or more buttons;
transmitting to the display unit, by a second transmission module comprising a transmitter, a set of signals causing the display unit to display at least one symbol representative of the characteristics of the runway and to display either:
   a symbol representative of the stopping distance on a dry runway and a symbol representative of the stopping distance on a wet runway; or
   a symbol representative of the stopping distance on a runway in the selected state.

3. The method as claimed in claim 2,
wherein determining distance, by the third determination module, comprises determining on a basis of signals coming from the piloting assistance unit:
   either coordinates of a stopping point of the aircraft on a dry runway on the reference line marking the runway and coordinates of a stopping point of the aircraft on a wet runway on the reference line marking the runway;
   or coordinates of a stopping point of the aircraft on a runway in a selected state on the reference line marking the runway.

4. The method as claimed in claim 2,
wherein transmitting to the display unit, by the second transmission module comprises:
transmitting, using the second transmission module, a set of signals to the display unit causing the display unit to display a symbol representative of the runway on the basis of the length of the runway and a symbol locating a runway vacate point based at least partially on coordinates of the runway vacate point on the reference line marking the runway; and
repetitively using the second transmission module, to transmit a set of signals causing the display unit to display:
   either a symbol representative of stopping distance of the aircraft on a dry runway on the basis of the coordinates of the stropping point on a dry runway and a symbol representative of stopping distance on a wet runway based at least partially on coordinates of the stopping point on a wet runway on the reference line marking the runway; and
   or a symbol representative of the stopping distance of the aircraft on a runway in the selected state based at least partially on coordinates of the stopping point on a runway in the selected state;
the display of these symbols being able to be refreshed by the display unit at each transmission of the sets of signals.

5. The method as claimed in claim 2, wherein the method further comprises reconfiguring the display unit comprising:
transmitting a control signal to the display unit commanding deletion of the symbols displayed when the piloting assistance unit changes from the first operating mode to the second operating mode; and
transmitting a control signal to the display unit commanding deletion of the symbols displayed when the piloting assistance unit changes from the second operating mode to the first operating mode.

6. The method as claimed in claim 1,
wherein determining the run distance corresponding to a distance necessary for the aircraft to attain a run speed comprises determining coordinates of a run point after which the aircraft attains a run speed on the reference line marking the runway, based at least partially on signals coming from the piloting assistance unit.

7. The method as claimed in claim 1, further comprising:
transmitting, using the first transmission module, a set of signals causing the display unit to display a symbol representative of the runway based at least partially on a length of the runway and a symbol locating a runway vacate point based at least partially on coordinates of the runway vacate point on the reference line marking the runway; and
repetitively using the first transmission module, to transmit a set of signals causing the display unit to display a symbol locating the run point on the basis of the coordinates of the run point, the display of this symbol being able to be refreshed by the display unit at each transmission of the set of signals.

8. A device for displaying a symbology for assisting piloting of an aircraft in a phase of landing on a runway in association with a piloting assistance unit for assisting piloting in a landing phase, the piloting assistance unit operating in at least a first operating mode and a second operating mode, the piloting assistance unit being configured to emit a signal representative of its operating mode, the device comprising:
   a display unit configured to display the symbology;
   a first determination module comprising one or more processors configured for determining characteristics of the runway, determining coordinates of an end of runway margin corresponding to a predetermined margin before a downstream end of the runway in a direction of landing of the aircraft, and determining a distance between a beginning of the runway and a runway vacate point and coordinates of the runway vacate point on a reference line marking the runway, based at least partially on signals coming from an airport database;
   a second determination module comprising one or more processors configured for repetitively determining a run distance corresponding to a distance necessary for the aircraft to attain a run speed, when the piloting assistance unit is configured to transmit to the second determination module a signal representative of the first operating mode;
   a first transmission module comprising a transmitter configured for repetitively transmitting a set of signals causing the display unit to display a symbol representative of the run distance, to display at least one symbol representative of the characteristics of the runway, to display a symbol representative of the vacate point, and to display a symbol representative of the predetermined margin on the basis of the coordinates of the end of runway margin; and
   a second transmission module comprising a transmitter configured to transmit coordinates of the vacate point to a braking unit of the aircraft configured to control brakes and thrust reversals of the aircraft based at least partially on the aircraft's proximity to the vacate point;

wherein the piloting assistance unit is configured to automatically operate in the first operating mode when the aircraft is below a predetermined altitude but has not landed yet.

9. The device as claimed in claim 8, further comprising:
a third determination module comprising one or more processors configured for repetitively determining, when the piloting assistance unit transmits to the third determination module a signal representative of a second operating mode:
  either a stopping distance on a dry runway and a stopping distance on a wet runway;
  or a stopping distance on a runway in a selected state, if the third determination module receives a signal representative of the selected runway state, the signal being configured to be transmitted to the third determination module by a runway state selection module comprising one or more buttons;
a second transmission module comprising a transmitter configured for repetitively transmitting a set of signals causing the display unit to display at least one symbol representative of the characteristics of the runway and to display:
  either a symbol representative of the stopping distance on a dry runway and a symbol representative of a stopping distance on a wet runway;
  or a symbol representative of the stopping distance on a runway in the selected state.

10. The device as claimed in claim 8, further comprising a reconfiguration module configured to:
  transmit a control signal to the display unit commanding deletion of symbols displayed on the display unit, when the piloting assistance unit changes from the first operating mode to the second operating mode;
  transmit a control signal to the display unit commanding deletion of symbols displayed on the display unit, when the piloting assistance unit changes from the second operating mode to the first operating mode.

11. A system for assisting piloting of an aircraft in a phase of landing on a runway, the system comprising:
  a display device as claimed in claim 8, the display unit corresponding to a navigation screen;
  a unit for assisting piloting in a landing phase.

12. An aircraft comprising a display device, the display device comprising:
  a device for displaying a symbology for assisting piloting of an aircraft in a phase of landing on a runway in association with a piloting assistance unit for assisting piloting in a landing phase, the piloting assistance unit operating in at least a first operating mode and a second operating mode, the piloting assistance unit being configured to emit a signal representative of its operating mode, wherein the display device comprises:
  a display unit configured to display the symbology;
  a first determination module comprising one or more processors configured for determining characteristics of the runway, determining coordinates of an end of runway margin corresponding to a predetermined margin before a downstream end of the runway in a direction of landing of the aircraft, and determining a distance between a beginning of the runway and a runway vacate point and coordinates of the runway vacate point on a reference line marking the runway, based at least partially on signals coming from an airport database;
  a second determination module comprising one or more processors configured for repetitively determining a run distance corresponding to a distance necessary for the aircraft to attain a run speed, when the piloting assistance unit transmits to the second determination module a signal representative of the first operating mode;
  a first transmission module comprising a transmitter configured for repetitively transmitting a set of signals causing the display unit to display a symbol representative of the run distance, to display at least one symbol representative of the characteristics of the runway and to display a symbol representative of the predetermined margin based at least partially on the coordinates of the end of runway margin; and
  a second transmission module comprising a transmitter configured to transmit coordinates of the vacate point to a braking unit of the aircraft configured to control brakes and thrust reversals of the aircraft based at least partially on the aircraft's proximity to the vacate point;
  wherein the piloting assistance unit is configured to automatically operate in the first operating mode when the aircraft is below a predetermined altitude but has not landed yet.

* * * * *